United States Patent
Chen et al.

(10) Patent No.: US 6,307,721 B1
(45) Date of Patent: Oct. 23, 2001

(54) THIN READ GAP MAGNETORESISTIVE (MR) SENSOR ELEMENT AND METHOD FOR FABRICATION THEREOF

(75) Inventors: Mao-Min Chen; Cherng-Chyi Han, both of San Jose; Cheng T. Horng, Santa Clara County, all of CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 09/148,558

(22) Filed: Sep. 4, 1998

(51) Int. Cl.$^7$ .................................................. G11B 5/39
(52) U.S. Cl. ............................................... 360/316
(58) Field of Search ...................... 360/316, 317, 360/318

(56) References Cited

U.S. PATENT DOCUMENTS 5,766,780 * 6/1998 Huang et al. ........................ 360/113
6,118,624 * 9/2000 Fukuzawa et al. ................... 360/113

* cited by examiner

Primary Examiner—George J. Letscher
(74) Attorney, Agent, or Firm—George O. Saile; Stephen B. Ackerman (57) ABSTRACT

A magnetoresistive (MR) sensor element and a method for fabricating the magnetoresistive (MR) sensor element. There is first provided a substrate. There is then formed over the substrate a first shield layer. There is then formed upon the first shield layer a first dielectric spacer layer. There is then formed upon the first dielectric spacer layer a patterned magnetoresistive (MR) layer. There is then formed adjacent to and electrically communicating with a pair of opposite ends of the patterned magnetoresistive (MR) layer a pair of patterned conductor lead layers to define a trackwidth of the patterned magnetoresistive (MR) layer. There is then formed upon the pair of patterned conductor lead layers and upon the patterned magnetoresistive (MR) layer at the trackwidth of the patterned magnetoresistive (MR) layer a blanket second dielectric spacer layer. Finally, there is then formed upon the blanket second dielectric spacer layer a second shield layer, where a first thickness of the blanket second dielectric spacer layer separating a patterned conductor lead layer within the pair of patterned conductor lead layers from the second shield layer is greater than a second thickness of the blanket second dielectric spacer layer separating the patterned magnetoresistive (MR) layer from the second shield layer within the trackwidth of the patterned magnetoresistive (MR) layer. The method contemplates a magnetoresistive (MR) sensor element fabricated in accord with the method.

16 Claims, 3 Drawing Sheets

THIN READ GAP MAGNETORESISTIVE (MR) SENSOR ELEMENT AND METHOD FOR FABRICATION THEREOF

BACKGROUND OF THE INVENTION

1. Field of the Invention

The present invention relates generally to methods for fabricating magnetic sensor elements. More particularly, the present invention relates to methods for fabricating magnetoresistive (MR) sensor elements with attenuated electrical leakage.

2. Description of the Related Art

The recent and continuing advances in computer and information technology have been made possible not only by the correlating advances in the functionality, reliability and speed of semiconductor integrated circuits, but also by the correlating advances in the storage density and reliability of direct access storage devices (DASDs) employed in digitally encoded magnetic data storage and retrieval.

Storage density of direct access storage devices (DASDs) is typically determined as areal storage density of a magnetic data storage medium formed upon a rotating magnetic data storage disk within a direct access storage device (DASD) magnetic data storage enclosure. The areal storage density of the magnetic data storage medium is defined largely by the track width, the track spacing and the linear magnetic domain density within the magnetic data storage medium. The track width, the track spacing and the linear magnetic domain density within the magnetic data storage medium are in turn determined by several principal factors, including but not limited to: (1) the magnetic read-write characteristics of a magnetic read-write head employed in reading and writing digitally encoded magnetic data from and into the magnetic data storage medium; (2) the magnetic domain characteristics of the magnetic data storage medium; and (3) the separation distance of the magnetic read-write head from the magnetic data storage medium.

With regard to the magnetic read-write characteristics of magnetic read-write heads employed in reading and writing digitally encoded magnetic data from and into a magnetic data storage medium, it is known in the art of magnetic read-write head fabrication that magnetoresistive (MR) read-write heads are generally superior to other types of magnetic readwrite heads when employed in retrieving digitally encoded magnetic data from a magnetic data storage medium. In that regard, magnetoresistive (MR) read-write heads are generally regarded as superior since magnetoresistive (MR) read-write heads are known in the art to provide high output digital read signal amplitudes, with good linear resolution, independent of the relative velocity of a magnetic data storage medium with respect to a magnetoresistive (MR) read-write head.

While magnetoresistive (MR) read-write heads are thus desirable within the art of digitally encoded magnetic data storage and retrieval, magnetoresistive (MR) read-write heads are nonetheless not entirely without problems within the art of digitally encoded magnetic data storage and retrieval. In that regard, it has become increasingly more difficult to form magnetoresistive (MR) read-write heads with increasingly thinner read gap thicknesses (i.e. separation of read gap shield layers) while forming the magnetoresistive (MR) read-write heads with attenuated electrical leakage (i.e. electrical shorts through thin dielectric layers separating conductor layers within the magnetoresistive (MR) read-write heads) to provide fully functional magnetoresistive (MR) read-write heads with enhanced reliability.

It is thus towards the goal of forming fully functional and reliable magnetoresistive (MR) read-write heads with attenuated read gap thicknesses that the present invention is directed.

Various methods and resultant magnetic head structures have been disclosed in the art of magnetic head fabrication for forming magnetic heads with enhanced functionality and reliability.

For example, Gill, in U.S. Pat. No. 5,467,881 discloses a method for fabricating a magnetoresistive (MR) read head with attenuated patterned conductor lead layer to shield layer electrical leakage at an air bearing surface (ABS) of the magnetoresistive (MR) read head. The method employs a patterned photoresist strip layer masking of a trackwidth of a magnetoresistive (MR) layer and co-extensive widths of adjoining layers within the magnetoresistive (MR) read head at an air bearing surface (ABS) of the magnetoresistive (MR) read head, followed by a reactive ion etch (RIE) etchback of unmasked portions of the air bearing surface (ABS) to remove conductor residues which bridge between the patterned conductor lead layers and the shield layers within the magnetoresistive (MR) read head.

In addition, Jennison, in U.S. Pat. No. 5,658,469, discloses a method for forming a re-entrant profiled patterned photoresist which may be employed as a lift-off mask for use in fabricating magnetoresistive (MR) sensor elements for use in magnetoresistive (MR) read heads. The re-entrant profiled patterned photoresist layer is formed from a straight sided patterned photoresist layer an upper portion of which is rendered insoluble with respect to a photoresist developer incident to a first electron beam exposure of the straight sided patterned photoresist layer and a lower portion of which is rendered soluble with respect to the photoresist developer solution incident to a second electron beam exposure of the straight sided patterned photoresist layer. The straight sided patterned photoresist layer is then developed with the photoresist developer solution to form the re-entrant profiled patterned photoresist layer.

Finally, Huang et al., in U.S. Pat. No. 5,721,008, discloses a method for controlling patterned magnetoresistive (MR) layer to patterned magnetoresistive (MR) layer overlay alignment within a dual stripe magnetoresistive (DSMR) sensor element which may be employed within a dual stripe magnetoresistive (MR) head. Within the method there is sequentially patterned, while employing a single patterned photoresist layer, a blanket first magnetoresistive (MR) layer having formed thereupon a blanket dielectric spacer layer in turn having formed thereupon a blanket second magnetoresistive (MR) layer to form a fully aligned patterned first magnetoresistive (MR) layer having formed thereupon a patterned dielectric spacer layer in turn having formed thereupon a patterned second magnetoresistive (MR) layer.

Desirable within the art of magnetoresistive (MR) sensor element fabrication are additional methods, and resulting magnetoresistive (MR) sensor element fabrications, which simultaneously provide fully functional and reliable magnetoresistive (MR) sensor elements with attenuated electrical leakage and attenuated read gap thickness.

It is towards providing magnetoresistive (MR) sensor elements in accord with the foregoing goals that the present invention is directed

SUMMARY OF THE INVENTION

A first object of the present invention is to provide a method for forming a magnetoresistive (MR) sensor element, and a magnetoresistive (MR) sensor element resulting from the method.

A second object of the present invention is to provide a method and resulting magnetoresistive (MR) sensor element in accord with the first object of the present invention, where the magnetoresistive (MR) sensor element is formed with attenuated electrical leakage and with an attenuated read gap thickness.

A third object of the present invention is to provide a method, and resultant magnetoresistive (MR) sensor element, in accord with the first object of the present invention and the second object of the present invention, which method by which the magnetoresistive (MR) sensor element is fabricated is readily commercially implemented.

In accord with the objects of the present invention, there is provided a method for forming a magnetoresistive (MR) sensor element, and a magnetoresistive (MR) sensor element which may be fabricated employing the method. To practice the method of the present invention, there is first provided a substrate. There is then formed over the substrate a first shield layer. There is then formed upon the first shield layer a first dielectric spacer layer. There is then formed upon the first dielectric spacer layer a patterned magnetoresistive (MR) layer. There is then formed adjacent to and electrically communicating with a pair of opposite ends of the patterned magnetoresistive (MR) layer a pair of patterned conductor lead layers to define a trackwidth of the patterned magnetoresistive (MR) layer. There is then formed upon the pair of patterned conductor lead layers and upon the patterned magnetoresistive (MR) layer at the trackwidth of the patterned magnetoresistive (MR) layer a blanket second dielectric spacer layer. Finally, there is then formed upon the blanket second dielectric spacer layer a second shield layer, where a first thickness of the blanket second dielectric spacer layer separating a patterned conductor lead layer within the pair of patterned conductor lead layers from the second shield layer is greater than a second thickness of the blanket second dielectric spacer layer separating the patterned magnetoresistive (MR) layer from the second shield layer within the trackwidth of the patterned magnetoresistive (MR) layer.

The method of the present invention contemplates a magnetoresistive (MR) sensor element which may be fabricated in accord with the method of the present invention.

The method of the present invention may also be employed to form a related dual stripe magnetoresistive (DSMR) sensor element by incorporation of a second patterned magnetoresistive (MR) layer, a pair of patterned second conductor lead layers and a blanket third dielectric spacer layer interposed between the blanket second dielectric spacer layer and the second shield layer.

There is provided by the present invention a method for forming a magnetoresistive (MR) sensor element, and a magnetoresistive (MR) sensor element formed in accord with the method, where the magnetoresistive (MR) sensor element is formed with attenuated electrical leakage while forming the magnetoresistive (MR) sensor element with an attenuated read gap thickness. The method of the present invention realizes the foregoing objects by employing when forming the magnetoresistive (MR) sensor element a greater thickness of a blanket second dielectric spacer layer separating a pair of patterned conductor lead layers from a shield layer within the magnetoresistive (MR) sensor element than the thickness of the blanket second dielectric spacer layer separating a patterned magnetoresistive (MR) layer within a trackwidth of the patterned magnetoresistive (MR) layer from the shield layer.

The method of the present invention is readily commercially implemented. The present invention employs methods and materials as are otherwise generally known in the art of magnetoresistive (MR) sensor element fabrication. Since it is a novel ordering of methods and materials which provides the method of the present invention, and a magnetoresistive (MR) sensor element fabricated in accord with the method of the present invention, rather than exclusively the existence of methods and materials which provides the present invention, the method of the present invention is readily commercially implemented

BRIEF DESCRIPTION OF THE DRAWINGS

The objects, features and advantages of the present invention are understood within the context of the Description of the Preferred Embodiments, as set forth below. The Description of the Preferred Embodiments is understood within the context of the accompanying drawings, which form a material part of this disclosure, wherein.

DESCRIPTION OF THE PREFERRED EMBODIMENTS

The present invention provides a method for forming a magnetoresistive (MR) sensor element, and a magnetoresistive (MR) sensor element fabricated in accord with the method, where the magnetoresistive (MR) sensor element is formed with attenuated electrical leakage while forming the magnetoresistive (MR) sensor element with an attenuated read gap thickness. The method of the present invention realizes the foregoing objects by employing when forming the magnetoresistive (MR) sensor element a greater thickness of a dielectric spacer layer separating a pair of patterned conductor lead layers from a shield layer within the magnetoresistive (MR) sensor element than a thickness of the dielectric spacer layer separating a patterned magnetoresistive (MR) layer within a trackwidth of the patterned magnetoresistive (MR) layer from the shield layer. When the method of the present invention is employed for forming a dual stripe magnetoresistive (DSMR) sensor element, there may also be employed within the dual stripe magnetoresistive (DSMR) sensor element formed in accord with the method of the present invention a greater thickness of a dielectric spacer layer separating successive pairs of patterned conductor lead layers within the dual stripe magnetoresistive (DSMR) sensor element than separating a successive pair of patterned magnetoresistive (MR) layers within the dual stripe magnetoresistive (DSMR) sensor element.

The present invention may be employed for forming magnetoresistive (MR) sensor elements including but not limited to single stripe magnetoresistive (SSMR) sensor elements, dual stripe magnetoresistive (DSMR) sensor elements, soft adjacent layer (SAL) magnetoresistive (MR) sensor elements, longitudinally magnetically biased magnetoresistive (MR) sensor elements, transversely magnetically biased magnetoresistive (MR) sensor elements and both longitudinally magnetically biased and transversely magnetically biased magnetoresistive (MR) sensor elements.

Figure 1:
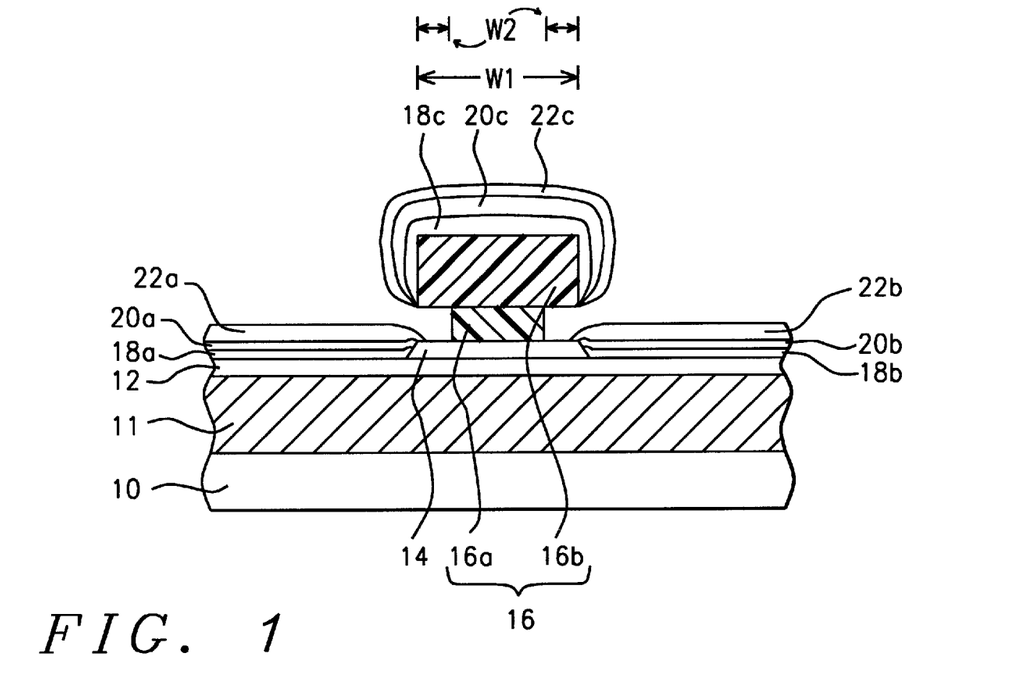
FIG. 1, FIG. 2, FIG. 3, FIG. 4 and FIG. 5 show a series of schematic air bearing surface (ABS) view diagrams illustrating the results of progressive stages in forming several magnetoresistive (MR) sensor elements in accord with the present invention.

Referring now to FIG. 1 to FIG. 5, there is shown a series of schematic air bearing surface (ABS) view diagrams of progressive stages in fabrication of a series of magnetoresistive (MR) sensor elements which may be formed employing the method of the present invention. Shown in FIG. 1 is a schematic air bearing surface (ABS) view diagram of a magnetoresistive (MR) sensor element at an early stage in its fabrication in accord with the method of the present invention.

Shown in FIG. 1 is a substrate 10 having formed thereupon a blanket first shield layer 11 which in turn has formed thereupon a blanket first dielectric spacer layer 12. Within the preferred embodiments of the present invention, the substrate 10, the blanket first shield layer 11 and the blanket first dielectric spacer layer 12 may be formed employing methods and materials as are conventional in the art of magnetoresistive (MR) sensor element fabrication.

For example, although it is known in the art of magnetoresistive (MR) sensor element fabrication that substrates are typically formed from non-magnetic ceramic materials such as but not limited to oxides, nitrides, borides, carbides and mixtures of oxides, nitrides, borides and carbides, for the preferred embodiments of the present invention, the substrate 10 is preferably formed from a non-magnetic aluminum oxide/titanium carbide ceramic material. Preferably, the substrate 10 so formed is formed with sufficient dimensions to allow the substrate 10 to be fabricated into a slider employed within a direct access storage device (DASD) magnetic data storage enclosure employed within digitally encoded magnetic data storage and retrieval, although a magnetoresistive (MR) sensor element formed in accord with the present invention may be employed within other digital magnetic data storage applications, as well as analog magnetic signal transduction applications.

Similarly, although it is also k now n in the art of magnetoresistive (MR) sensor element fabrication that shield layers may be formed from any of several soft magnetic materials, including but not limited to permalloy (ie: nickel-iron alloy) soft magnetic materials and higher order alloy soft magnetic materials incorporating permalloy soft magnetic materials (ie: nickel-iron-rhodium soft magnetic materials and nickel-iron-chromium soft magnetic materials), for the preferred embodiment of the present invention, the blanket first shield layer 11 is preferably formed of a permalloy (ie: nickel-iron, 80:20, w/w) soft magnetic material. Preferably, the blanket first shield layer 11 is formed to a thickness of from about 10000 to about 30000 angstroms.

Finally, within the preferred embodiments of the present invention with respect to the blanket first dielectric spacer layer 12, although the blanket first dielectric spacer layer 12 may be formed employing methods and materials as are conventional in the art of magnetoresistive (MR) sensor element fabrication, including but not limited to chemical vapor deposition (CVD) methods, plasma enhanced chemical vapor deposition (PECVD) method s and physical vapor deposition (PVD) sputtering methods through which may be formed dielectric spacer layers of dielectric materials including but not limited to silicon oxide dielectric materials, silicon nitride dielectric materials, nitrogenated carbon dielectric materials and aluminum oxide dielectric materials, for the preferred embodiments of the present invention, the blanket first dielectric spacer layer 12 is preferably formed of an aluminum oxide dielectric material deposited employing a physical vapor deposition (PVD) sputtering method, as is most common in the art of magnetoresistive (MR) sensor element fabrication. Preferably, the blanket first dielectric spacer layer 12 so formed is formed to a thickness of from about 100 to about 1000 angstroms.

Shown also within FIG. 1 formed upon the blanket first dielectric spacer layer 12 is a patterned first magnetoresistive (MR) layer 14. Although not specifically illustrated within the schematic air bearing surface (ABS) view diagram of FIG. 1, within the preferred embodiments of the present invention, the patterned first magnetoresistive (MR) layer 14 may optionally additionally have formed therebeneath a soft adjacent layer (SAL) transverse magnetic biasing layer separated from a lower surface of the patterned first magnetoresistive (MR) layer 14 by a non-magnetic spacer layer. Typically and preferably, the patterned first magnetoresistive (MR) layer 14 is formed from a magnetoresistive (MR) material analogous or equivalent to the soft magnetic material employed for forming the blanket first shield layer 11. Similarly, when the patterned first magnetoresistive (MR) layer 14 has formed therebeneath a soft adjacent layer (SAL) transverse magnetic biasing layer, both the patterned first magnetoresistive (MR) layer 14 and the soft adjacent layer (SAL) are formed from a soft magnetic material analogous or equivalent to the soft magnetic material employed for forming the blanket first shield layer 11, although the blanket first magnetoresistive (MR) layer 14 and the soft adjacent layer (SAL) are typically and preferably not formed of the same soft magnetic material. Preferably, the patterned first magnetoresistive (MR) layer 14 is formed upon the blanket first dielectric spacer layer 12 to a thickness of from about 50 to about 500 angstroms, where the optional soft adjacent layer (SAL), if present, is formed to a thickness of from about 50 to about 500 angstroms and the non-magnetic spacer layer, if present, is formed to a thickness of from about 30 to about 100 angstroms.

Although not specifically illustrated within the schematic air bearing surface (ABS) view diagram of FIG. 1, in order to assure optimal magnetic saturation of an optional soft adjacent layer (SAL), it is optional that there may be formed interposed between the blanket first dielectric spacer layer 12 and the soft adjacent layer (SAL) either a blanket or a patterned hard magnetic biasing layer contacting the soft adjacent layer (SAL). The blanket or patterned hard magnetic biasing layer, if formed, is preferably from about 100 to about 300 angstroms thick, and preferably formed from a hard magnetic material, such as but not limited to an iron-manganese alloy hard magnetic material, a nickel-manganese alloy hard magnetic material, a cobalt-chroium alloy hard magnetic material or rare earth alloy hard magnetic material, as is conventional in the art of magnetoresistive (MR) sensor element fabrication.

There is also shown in FIG. 1 the presence of a first lift off stencil 16 formed upon the patterned first magnetoresistive (MR) layer 14. The first lift off stencil 16 comprises a patterned first release layer 16a formed upon the patterned first magnetoresistive (MR) layer 14 and a patterned first photoresist layer 16b formed symmetrically overhanging the patterned first release layer 16a. While any of several release materials may be employed in forming the patterned first release layer 16a, including but not limited to organic polymer release materials such as but not limited to polysulfone organic polymer release materials and polyimide organic polymer release materials, for the preferred embodiments of the present invention the patterned first release layer 16a is preferably formed of a PMGI organic polymer release material which is an organic polymer photoresist material. Preferably, the patterned first release layer 16a is formed to a thickness of from about 500 to about 10000 angstroms upon the patterned first magnetoresistive (MR) layer 14. Similarly, although any of several photoresist materials may be employed for forming the patterned first photoresist layer 16b, including but not limited to photoresist materials selected from the general groups of photoresist materials including but not limited to positive photoresist materials and negative photoresist materials, for the preferred embodiments of the present invention the patterned photoresist layer 16b is preferably formed of a positive photoresist material in order to provide optimal dimensional integrity when forming the first lift off stencil 16. Preferably, the patterned photoresist layer 16b is formed to a thickness of from about 5000 to about 20000 angstroms. The PMGI material from which is formed the patterned first release layer 16a and the positive photoresist material from which is formed the patterned photoresist layer 16b have different photolithographic properties.

In order to fabricate the first lift off stencil 16 as illustrated in FIG. 1, there is first formed upon a blanket first magnetoresistive (MR) layer from which is formed the patterned first magnetoresistive (MR) layer 14 a blanket first release layer from which is formed the patterned first release layer 16a. There is then formed upon the blanket first release layer a blanket first photoresist layer from which is formed the patterned first photoresist layer 16b. The patterned first photoresist layer 16b is then photoexposed and developed from the blanket first photoresist layer. Next, the patterned first release layer 16a is formed by etching the blanket first release layer within an isotropic etchant (typically an organic solvent) while employing the patterned first photoresist layer 16b as a mask for a sufficient time to provide the uniform overhang of the patterned first photoresist layer 16b with respect to the patterned first release layer 16a.

Preferably, the patterned first photoresist layer 16b has a width W1 (which approximates a first trackwidth of the patterned first magnetoresistive (MR) layer 14) over the patterned first magnetoresistive (MR) layer 14 of from about 0.2 to about 10 microns, as illustrated in FIG. 1, while the patterned first photoresist layer 16b symmetrically overhangs each edge of the patterned first release layer 16a by a width W2 of from about 0.05 to about 2.0 microns, as similarly illustrated in FIG. 1.

Finally, the first lift off stencil 16 is employed as an etch mask when forming the patterned first magnetoresistive (MR) layer 14 (along with an optional coextensive patterned soft adjacent layer (SAL) and an optional patterned non-magnetic spacer layer) from the blanket first magnetoresistive (MR) layer (along with optional blanket soft adjacent layer (SAL) and optional blanket non-magnetic spacer layer).

Finally, there is shown within FIG. 1: (1) a pair of patterned first longitudinal magnetic biasing layers 18a and 18b formed abutting a pair of opposite ends of the patterned first magnetoresistive (MR) layer 14; (2) a pair of patterned first conductor lead layers 20a and 20b formed upon the pair of patterned first longitudinal magnetic biasing layers 18a and 18b; and (3) a pair of patterned second dielectric spacer layers 22a and 22b formed upon the pair of patterned conductor lead layers 20a and 20b. Similarly, there is also shown formed upon the first lift off stencil 16 a patterned first longitudinal magnetic biasing layer residue 18c having formed thereupon; (2) a patterned first conductor lead layer residue 20c having in turn formed thereupon; (3) a patterned second dielectric spacer layer residue 22c.

Each of the foregoing series of nine patterned layers is formed employing a sputter deposition method as is known in the art of magnetoresistive (MR) sensor element fabrication. Within the sputter deposition method, the patterned first longitudinal magnetic biasing layers 18a and 18b, and the patterned first longitudinal magnetic biasing layer residue 18c, may be formed from hard magnetic materials such as but not limited to: (1) magnetic exchange coupling hard magnetic materials, such as but not limited to iron-manganese alloy magnetic exchange coupling hard magnetic materials and nickel-manganese alloy magnetic exchange coupling hard magnetic materials; and (2) permanent magnet hard magnetic materials such as but not limited to cobalt-chromium alloy permanent magnet hard magnetic materials and rare earth alloy permanent magnet hard magnetic materials. Similarly, within the sputter deposition method the patterned first conductor lead layers 20a and 20b, and the patterned first conductor lead layer residue 20c may be formed from conductor lead materials as are known in the art of magnetoresistive (MR) sensor element fabrication, such conductor lead materials including but not limited to gold, gold alloy, molybdenum, molybdenum alloy, copper, copper alloy, aluminum and aluminum alloy conductor lead materials. Finally, within the sputter deposition method the patterned second dielectric spacer layers 22a and 22b, and the patterned second dielectric spacer layer residue 22c may be formed from dielectric spacer materials analogous or equivalent to the dielectric spacer materials employed for forming the blanket first dielectric spacer layer 12.

Preferably, the patterned first longitudinal magnetic biasing layers 18a and 18b, and the patterned first longitudinal magnetic biasing layer residue 18c, are each formed to a thickness of from about 50 to about 500 angstroms. Preferably, the patterned first conductor lead layers 20a and 20b, and the patterned first conductor lead layer residue 20c, are each formed to a thickness of from about 300 to about 1000 angstroms. Preferably, the patterned second dielectric spacer layers 22a and 22b, and the patterned second dielectric spacer layer residue 22c, are each formed to a thickness of from about 200 to about 500 angstroms.

Within the magnetoresistive (MR) sensor element whose schematic air bearing surface (ABS) view diagram is illustrated in FIG. 1, the patterned first longitudinal magnetic biasing layers 18a and 18b are optional, along with the patterned first longitudinal magnetic biasing layer residue 18c, although they are preferably employed to provide enhanced noise suppression within the magnetoresistive (MR) sensor element. With or without the presence of the patterned first longitudinal magnetic biasing layers 18a and 18b, the patterned first conductor lead layers 20a and 20b electrically communicate through conduction with the patterned first magnetoresistive (MR) layer 14.

Figure 2:
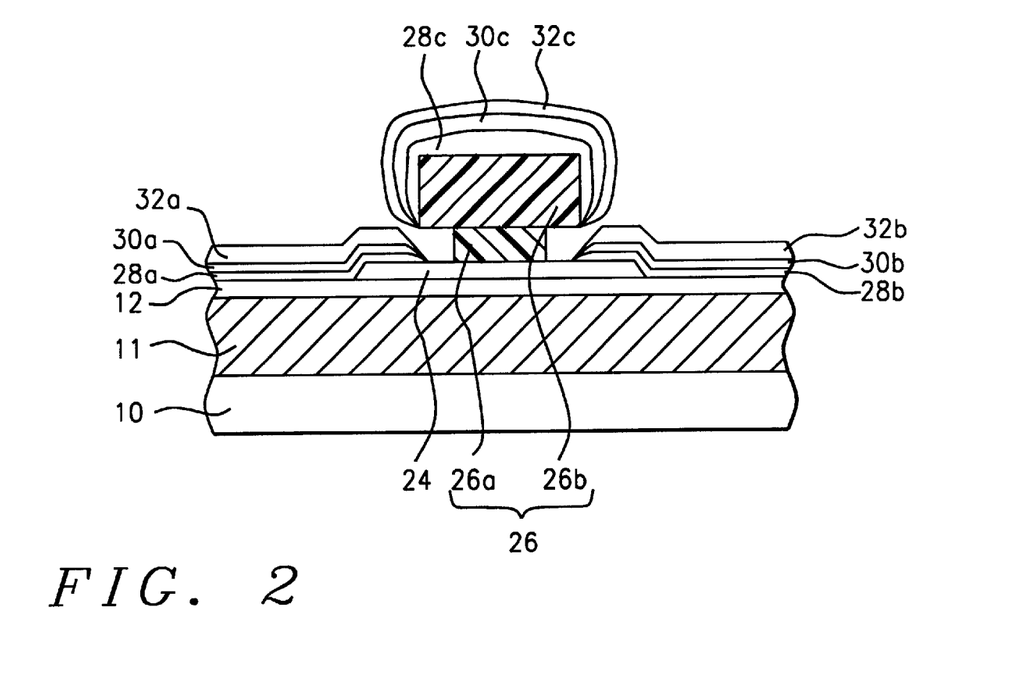

Referring now to FIG. 2, there is shown a schematic air bearing surface (ABS) view diagram illustrating an alternate magnetoresistive (MR) sensor element structure which may be employed within the preferred embodiments of the present invention in place of the magnetoresistive (MR) sensor element structure whose schematic air bearing surface (ABS) view diagram is illustrated in FIG. 1. Shown in FIG. 2 is a schematic air bearing surface (ABS) view diagram of a magnetoresistive (MR) sensor element largely equivalent to the magnetoresistive (MR) sensor element whose schematic air bearing surface (ABS) view diagram is illustrated in FIG. 1, but wherein, primarily, an alternate first lift off stencil 26 is employed, where the alternate first lift off stencil 26 is not sequentially employed as an etch mask for forming an alternate patterned first magnetoresistive (MR) layer 24 which corresponds with the patterned first magnetoresistive (MR) layer 14 as illustrated in FIG. 1. Thus, within the schematic air bearing surface (ABS) view diagram as illustrated within FIG. 2, the alternate patterned first magnetoresistive (MR) layer 24 is not nominally aligned with the patterned first photoresist layer 26b within the alternate first lift off stencil 26, but rather extends from beneath a pair of opposite edges of the patterned first photoresist layer 26b within the alternate first lift off stencil 26.

Similarly, since the alternate patterned first magnetoresistive (MR) layer 24 extends from beneath a pair of opposite edges of the patterned first photoresist layer 26b within the alternate first lift off stencil 26, the corresponding patterned first longitudinal magnetic biasing layers 28a and 28b, the corresponding patterned first conductor lead layers 30a and 30b and the corresponding patterned second dielectric spacer layers 32a and 32b extend upon a pair of opposite ends of the alternate patterned first magnetoresistive (MR) layer 24 rather than simply substantially abutting that layer as is otherwise illustrated with respect to the patterned first magnetoresistive (MR) layer 14 as illustrated within the magnetoresistive (MR) sensor element whose schematic air-bearing surface (ABS) view diagram is illustrated in FIG. 1. In conjunction with the typical and preferred circumstances where alternate first lift off stencil 26 is formed employing dimensions analogous or equivalent to the dimensions employed for forming the first lift off stencil 16, the patterned first longitudinal magnetic biasing layer residue 28c, the patterned first conductor lead layer residue 30c and the patterned second dielectric spacer layer residue 32c are formed analogously or equivalently with the patterned first longitudinal magnetic biasing layer residue 18c, the patterned first conductor lead layer residue 20c and the patterned second dielectric spacer layer residue 22c as illustrated within the magnetoresistive (MR) sensor element whose schematic air bearing surface (ABS) view diagram is illustrated in FIG. 1.

Although either the magnetoresistive (MR) sensor element whose schematic air bearing surface (ABS) view diagram is illustrated in FIG. 1 or the magnetoresistive (MR) sensor element whose schematic air bearing surface (ABS) view diagram is illustrated in FIG. 2 may be employed within the preferred embodiments of the present invention with functionally equivalent results, further disclosure of the preferred embodiments of the present invention is undertaken within the context of further processing of the magnetoresistive (MR) sensor element whose schematic air bearing surface (ABS) view diagram is illustrated within FIG. 1, in order to provide for simplicity within this disclosure.

Figure 3:
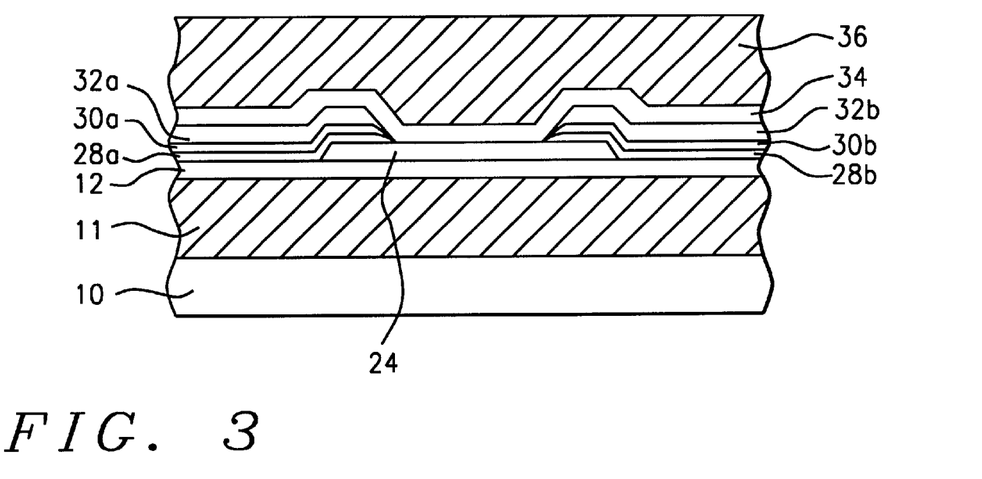

Referring now to FIG. 3, there is shown a schematic air bearing surface (ABS) view diagram illustrating the results of further processing of the magnetoresistive (MR) sensor element whose schematic air bearing surface (ABS) view diagram is illustrated in FIG. 2. Shown in FIG. 3 is a schematic air bearing surface (ABS) view diagram of a magnetoresistive (MR) sensor element otherwise equivalent to the magnetoresistive (MR) sensor element whose schematic air bearing surface (ABS) view diagram is illustrated in FIG. 2, but wherein: (1) the alternate first lift off stencil 26 has been stripped from the patterned first magnetoresistive (MR) layer 24, taking with it the patterned first longitudinal magnetic biasing layer residue 28c, the patterned first conductor lead layer residue 30c and the patterned second dielectric spacer layer residue 32c; (2) there is then formed upon the resulting magnetoresistive (MR) sensor element fabrication a blanket third dielectric spacer layer 34; and (3) there is then formed upon the blanket third dielectric spacer layer 34 a blanket second shield layer 36.

With respect to the first lift off stencil 26, the first lift off stencil 26 may be stripped from the magnetoresistive (MR) sensor element whose schematic air bearing surface (ABS) view diagram is illustrated in FIG. 2 to provide in part the magnetoresistive (MR) sensor element whose schematic air bearing surface (ABS) view diagram is illustrated in FIG. 3 employing stripping methods as are convention for the release material from which is formed the patterned first release layer 26a, such stripping methods typically employing an appropriate organic solvent, typically at elevated temperature.

With respect to the blanket third dielectric spacer layer 34, the blanket third dielectric spacer 34 may be formed employing methods and materials analogous or equivalent to the methods and materials employed in forming the blanket first dielectric spacer layer 12.

Similarly, with respect to the blanket second shield layer 36, the blanket second shield layer 36 may be formed employing methods and materials analogous or equivalent to the methods and materials employed in forming the blanket first shield layer 11. Preferably, the blanket third dielectric spacer layer 34 is formed conformally to a thickness of from about 100 to about 1000 angstroms, while the blanket second shield layer 36 is formed to a thickness of from about 20000 to about 40000 angstroms.

Upon forming the magnetoresistive (MR) sensor element whose schematic air bearing surface (ABS) view diagram is illustrated in FIG. 3, there is formed a magnetoresistive (MR) sensor element wherein th ere is attenuated electrical leakage bet ween a pair of patterned conductor lead layers and a blanket shield layer while still maintaining an attenuated read gap thickness of the magnetoresistive (MR) sensor element. The foregoing objects are realized within the magnetoresistive (MR) sensor element by employing a greater thickness, of from about 300 to about 1500 angstroms, of a dielectric spacer layer interposed between the pair of patterned conductor lead layers and the shield layer than between a patterned magnetoresistive (MR) layer and the shield layer at the trackwidth of the patterned magnetoresistive (MR) layer, which is preferably from about 100 to about 1000 angstroms.

Although the magnetoresistive (MR) sensor element whose schematic air bearing surface (ABS) view diagram is illustrated in FIG. 3 illustrates that this desired result is realized by employing a bilayer dielectric spacer layer formed interposed between the patterned conductor lead layers and the shield layer and an in part contiguous monolayer dielectric spacer layer formed interposed between the patterned magnetoresistive (MR) layer and the shield layer, the object of the present invention is realized in the first instance by the comparative magnitudes of separation distances of the pair of patterned conductor lead layers and the patterned magnetoresistive layer from the shield layer, and not specifically the number of dielectric spacer layers employed for providing those separation distances.

Figure 4:
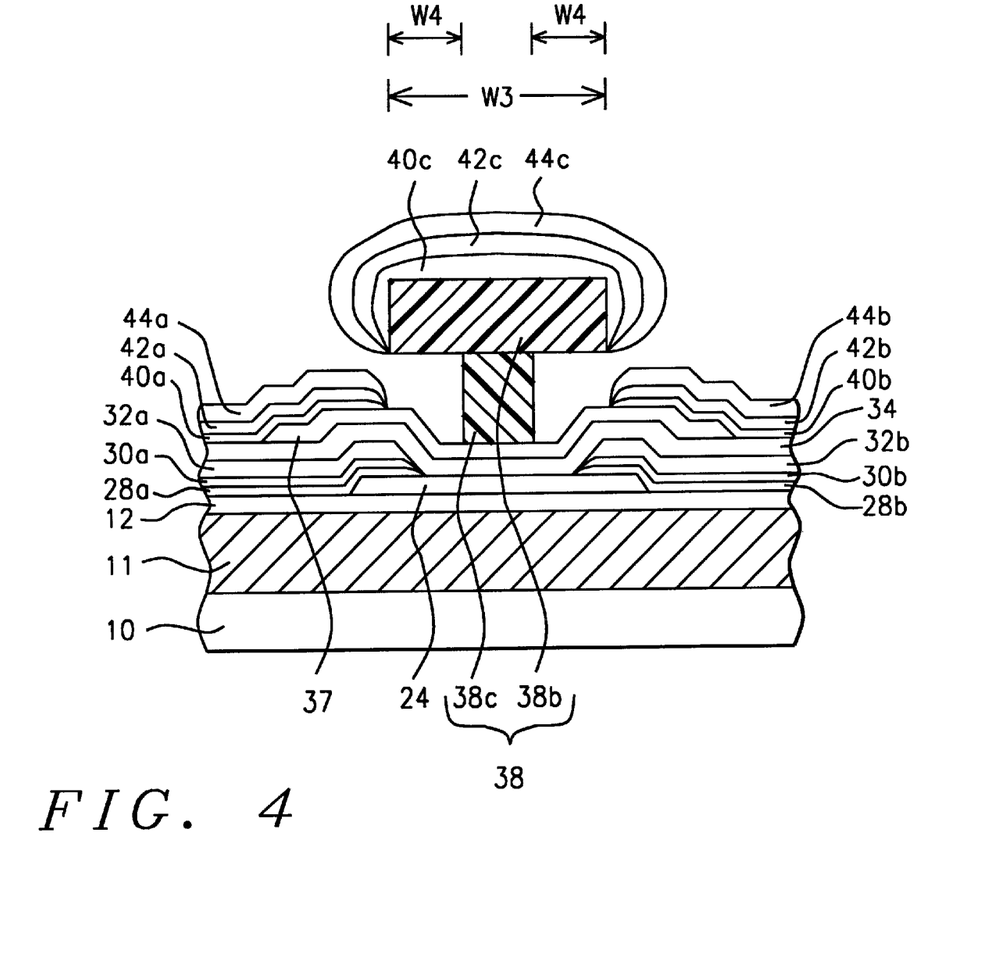

Referring now to FIG. 4, there is shown a schematic air bearing surface (ABS) view diagram illustrating the results of an alternate further processing of the magnetoresistive (MR) sensor element whose schematic air bearing surface (ABS) view diagram is illustrated in FIG. 2. First, FIG. 4 illustrates the results of further processing of the magnetoresistive (MR) sensor element whose schematic air bearing surface (ABS) is illustrated in FIG. 2 to provide in part the magnetoresistive (MR) sensor element whose schematic air bearing surface (ABS) view diagram is illustrated in FIG. 3, but wherein the blanket second shield layer 36 is not formed.

Rather, there is instead formed upon the blanket third dielectric spacer layer 34 a patterned second magnetoresistive (MR) layer 37, where the patterned second magnetoresistive (MR) layer 37 which in turn has formed thereupon a second lift off stencil 38 which comprises a patterned second soluble underlayer 38a having formed symmetrically overhanging thereupon a patterned second photoresist layer 38b. Within the magnetoresistive (MR) sensor element whose schematic air bearing surface (ABS) view diagram is illustrated in FIG. 4, the patterned second magnetoresistive layer 37 may be formed employing methods, materials and thickness dimensions analogous or equivalent to the methods, materials and thickness dimensions employed when forming the patterned first magnetoresistive (MR) layer 24. However, within the magnetoresistive (MR) sensor element whose schematic air baring surface (ABS) view diagram is illustrated within FIG. 4, there is typically and preferably not employed an optional soft adjacent layer nor an optional non-magnetic spacer layer with respect to either the patterned first magnetoresistive (MR) layer 24 or the patterned second magnetoresistive (MR) layer 37.

Within the magnetoresistive (MR) sensor element whose schematic air bearing surface (ABS) view diagram is illustrated in FIG. 4 with respect to the second lift off stencil 38, the second lift off stencil 38 is preferably formed employing methods, materials and thickness dimensions analogous or equivalent to the methods, materials and thickness dimensions employed for forming first lift off stencil 16 as illustrated within the magnetoresistive (MR) sensor element whose schematic air bearing surface (ABS) view diagram is illustrated in FIG. 1 or the alternate first lift off stencil 26 as illustrated within magnetoresistive (MR) sensor element whose schematic air bearing surface (ABS) view diagram is illustrated in FIG. 2. As is illustrated within FIG. 4, the patterned second photoresist layer 38b within the second lift off stencil 38 preferably has a linewidth W3 of from about 0.2 to about 10 microns which corresponds with a second trackwidth of the patterned second magnetoresistive (MR) layer 37. Similarly, the patterned second photoresist layer 38b symmetrically overhangs the patterned second release layer 38a by a width W4 of from about 0.05 to about 2.0 microns, as illustrated within FIG. 4.

Finally, there is also shown in FIG. 4 the presence of: (1) a pair of patterned second longitudinal magnetic biasing layers 40a and 40b formed upon the blanket third dielectric spacer layer 34 and covering a pair of opposite ends of the patterned second magnetoresistive layer 37; (2) a pair of patterned second conductor lead layers 42a and 42b formed upon the pair of patterned second longitudinal magnetic biasing layers 40a and 40b; (3) a pair of patterned fourth dielectric spacer layers 44a and 44b formed upon the pair of patterned second conductor lead layers 42a and 42b; and (4) a patterned second longitudinal magnetic biasing layer residue 40c having formed thereupon a patterned second conductor lead layer residue 42c in turn having formed thereupon a patterned third dielectric spacer layer residue 44c, all of which are formed upon the patterned second photoresist layer 38b within the second lift off stencil 38.

Within the magnetoresistive (MR) sensor element whose schematic air bearing surface (ABS) view diagram is illustrated in FIG. 4, the patterned second longitudinal magnetic biasing layers 40a and 40b, and the patterned second longitudinal magnetic biasing layer residue 40c are preferably formed employing methods, materials and thickness dimensions analogous or equivalent to the methods, materials and thickness dimensions employed for forming the patterned first longitudinal magnetic biasing layers 28a and 28b, and the patterned first longitudinal magnetic biasing layer residue 28c, as illustrated in FIG. 2. Similarly, within the magnetoresistive (MR) sensor element whose schematic air bearing surface (ABS) view diagram is illustrated in FIG. 4, the patterned second conductor lead layers 42a and 42c, and the patterned second conductor lead layer residue 42c are preferably formed employing methods, materials and thickness dimensions analogous or equivalent to the methods, materials and thickness dimensions employed for forming the patterned first conductor lead layers 30a and 30b and the patterned first conductor lead layer residue 30c, as illustrated in FIG. 2. Finally, within the magnetoresistive (MR) sensor element whose schematic air bearing surface (ABS) view diagram is illustrated in FIG. 4, the patterned fourth dielectric spacer layers 44a and 44b, and the patterned fourth dielectric spacer layer residue 44c are preferably formed employing methods, materials and thickness dimensions analogous or equivalent to the methods, materials and thickness dimensions employed for forming the patterned second di electric spacer layers 32a and 32b, and the patterned second dielectric spacer layer residue 32c, as illustrated in FIG. 2.

Figure 5:
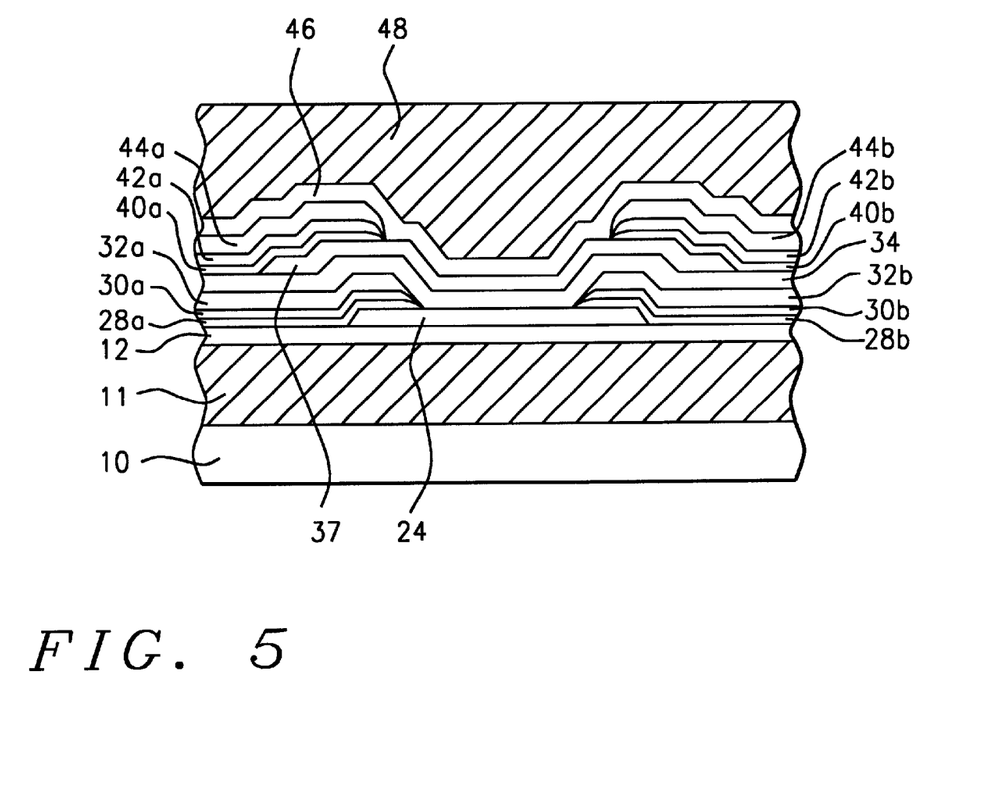

Referring now to FIG. 5, there is shown a schematic air bearing surface (ABS) view diagram illustrating the results of further processing of the magnetoresistive (MR) sensor element whose schematic air bearing surface (ABS) view diagram is illustrated in FIG. 4. Shown in FIG. 5 is a schematic air bearing surface (ABS) view diagram of a magnetoresistive (MR) sensor element otherwise equivalent to the magnetoresistive (MR) sensor element whose schematic air bearing surface (ABS) view diagram is illustrated in FIG. 4, but wherein: (1) the second lift off stencil 38 has been stripped from the magnetoresistive (MR) sensor element, taking with it the patterned second longitudinal magnetic biasing layer residue 40c, the patterned second conductor lead layer residue 42c and the patterned fourth dielectric spacer layer residue 44c; (2) there is then formed upon the magnetoresistive (MR) sensor element a blanket fifth dielectric spacer layer 46; and (3) there is then formed upon the blanket fifth dielectric spacer layer 46 a blanket second shield layer 48.

When forming the magnetoresistive (MR) sensor element whose schematic air bearing surface (ABS) view diagram is illustrated in FIG. 5 from the magnetoresistive (MR) sensor element whose schematic air bearing surface (ABS) view diagram is illustrated in FIG. 4, the second lift off stencil 38 may be stripped employing methods and materials analogous or equivalent to the methods and materials employed for stripping the first lift off stencil 26 as illustrated within FIG. 2 to provide in part the magnetoresistive (MR) sensor element whose schematic air bearing surface (ABS) view diagram is illustrated in FIG. 3. Similarly, the blanket fifth dielectric spacer layer 46 is preferably formed employing methods, materials and thickness dimensions analogous or equivalent to the methods, materials and thickness dimensions employed in forming the blanket third dielectric spacer layer 34. Finally, the blanket second shield layer 48 is preferably formed employing methods, materials and thickness dimensions analogous or equivalent to the methods, materials and thickness dimensions employed for forming the blanket second shield layer 36 as illustrated within magnetoresistive (MR) sensor element whose schematic air bearing surface view diagram is illustrated in FIG. 3.

Upon forming the magnetoresistive (MR) sensor element whose schematic air bearing surface (ABS) view diagram is illustrated in FIG. 5, there is formed a dual stripe magnetoresistive (DSMR) sensor element wherein in addition to attenuating electrical leakage between a pair of patterned conductor lead layers and a second shield layer there is also attenuated electrical leakage between successive pairs of patterned conductor lead layers, while similarly attenuating a read gap thickness of the dual stripe magnetoresistive (DSMR) sensor element. The dual stripe magnetoresistive (DSMR) sensor element of FIG. 5 realizes the foregoing objects by employing interposed between two successive pair of patterned conductor lead layers and a successive pair of patterned magnetoresistive (MR) layers a blanket dielectric spacer layer having a thickness interposed between the two successive pair of patterned conductor lead layers greater than a thickness interposed between the pair of patterned magnetoresistive (MR) layers.

As is understood by a person skilled in the art the magnetoresistive (MR) sensor element illustrated within the air bearing surface (ABS) view diagram of FIG. 3 or the air bearing surface view diagram of FIG. 5 may be formed into a magnetoresistive (MR) read-write head by way of additional processing of the magnetoresistive (MR) sensor element whose schematic air bearing surface view diagram is illustrated within FIG. 3 or FIG. 5. Such additional processing will typically and preferably include formation of magnetic inductor pole layers, additional dielectric spacer layers, interconnect layers, passivation layers and encapsulating layers as are conventional in the art of magnetoresistive (MR) read-write head fabrication.

As is understood by a person skilled in the art, the preferred embodiments of the present invention are illustrative of the present invention rather than limiting of the present invention. Revisions and modifications may be made to materials, structures and dimensions through which is provided magnetoresistive (MR) sensor elements in accord with the preferred embodiments of the present invention while still providing a magnetoresistive (MR) sensor element in accord with the spirit and scope of the present invention, as defined by the following claims.

What is claimed is:

1. A magnetoresistive (MR) sensor element maintaining an attenuated read gap thickness while having attenuated leakage between conductor lead layers and a blanket shield layer comprising:
    a substrate;
    a first shield layer formed over the substrate;
    a first dielectric spacer layer formed upon the first shield layer;
    a patterned magnetoresistive (MR) layer formed upon the first dielectric spacer layer, said magnetoresistive (MR) layer being formed by use of a novel lift off stencil;
    a pair of patterned longitudinal magnetic biasing layers formed adjacent to and covering a pair of opposite ends of the patterned magnetoresistive (MR) layer, said patterned magnetic biasing layers being formed by using the same said novel lift off stencil;
    a pair of patterned conductor lead layers formed adjacent to and communicating electrically with a pair of opposite ends of the patterned magnetoresistive (MR) layer to define a trackwidth of the patterned magnetoresistive (MR) layer, said patterned conduct lead layers being formed by using the same novel lift off stencil;
    a pair of patterned second dielectric spacer layers being formed over the said patterned conductor lead layers and extending over opposite ends of said patterned magnetoresistive (MR) layer but not completely covering said magnetoresistive (MR) layer, said dielectric spacer layers being formed by using the same novel lift off stencil;
    a blanket third dielectric spacer layer formed upon the pair of patterned second dielectric spacer layers and upon the patterned magnetoresistive (MR) layer at the trackwidth of the patterned magnetoresistive (MR) layer; and
    a second shield layer formed upon the blanket third dielectric spacer layer, where a sum of the thicknesses of the second patterned dielectric spacer layer plus the third blanket dielectric spacer layer separating a patterned conductor lead layer within a pair of patterned conductor lead layers from the second shield layer is greater than a single thickness of the blanket third dielectric spacer layer separating the patterned magnetoresistive (MR) layer from the second shield layer within the trackwidth of the patterned magnetoresistive (MR) layer.

2. The magnetoresistive (MR) sensor element of claim 1 wherein the sum of the thicknesses of the third blanket dielectric layer plus the second patterned dielectric layer attenuates electrical leakage between the patterned first conductor lead layer and the second shield layer.

3. The magnetoresistive (MR) sensor element of claim 1 wherein the magnetoresistive (MR) sensor element is selected from the group consisting of single stripe magnetoresistive (SSMR) sensor elements, dual stripe magnetoresistive (DSMR) sensor elements, soft adjacent layer (SAL) magnetoresistive (MR) sensor elements, longitudinally magnetically biased magnetoresistive (MR) sensor elements, transversely magnetically biased magnetoresistive (MR) sensor elements and both transversely and longitudinally magnetically biased magnetoresistive (MR) sensor elements.

4. The magnetoresistive (MR) sensor element of claim 1 wherein the second patterned dielectric spacer layer thickness is from about 300 to about 1500 angstroms and the third blanket dielectric layer thickness is from about 100 angstroms to about 1000 angstroms.

5. A magnetic data storage enclosure having fabricated therein a magnetoresistive (MR) sensor element in accord with claim 1.

6. A dual stripe magnetoresistive (DSMR) sensor element maintaining attenuated read gap thickness while having attenuated leakage between successive pairs of conductor lead layers and between a pair of conductor lead layers and a blanket second shield comprising:
    a substrate;
    a first shield layer formed over the substrate;
    a first dielectric spacer layer formed upon the first shield layer;
    a patterned first magnetoresistive (MR) layer formed upon the first dielectric spacer layer, said first magnetoresistive (MR) layer being patterned by use of a first novel lift off stencil;
    a pair of patterned first longitudinal magnetic biasing layers formed adjacent to and covering a pair of opposite ends of the patterned first magnetoresistive (MR) layer, said magnetic biasing layer being formed by using the same said first novel lift off stencil;
    a pair of patterned first conductor lead layers formed adjacent to and communicating electrically with a pair of opposite ends of the patterned first magnetoresistive (MR) layer to define a trackwidth of the patterned first magnetoresistive (MR) layer said patterned conductor lead layers being formed by using the same first novel lift off stencil;
    a pair of patterned second dielectric spacer layers being formed over the said patterned conductor lead layers, and extending over opposite ends of the patterned first magnetoresistive (MR) layer but not completely covering said patterned first magnetoresistive (MR) layer, said dielectric spacer layers being formed by using the same first novel lift off stencil;

a blanket third dielectric spacer layer formed upon the pair of patterned second dielectric layers and the patterned first magnetoresistive (MR) layer at the first trackwidth of the patterned first magnetoresistive (MR) layer;

a patterned second magnetoresistive layer formed upon the blanket third dielectric spacer layer, said second magnetoresistive (MR) layer being patterned by use of a second novel lift off stencil;

a pair of patterned second longitudinal magnetic biasing layers formed adjacent to and covering a pair of opposite ends of the patterned second magnetoresistive (MR) layer, said patterned magnetic biasing layers being formed by using the same said second novel lift off stencil;

a pair of patterned second conductor lead layers formed adjacent to and communicating electrically with a pair of opposite ends of the patterned second magnetoresistive (MR) layer to define a second trackwidth of the patterned second magnetoresistive (MR) layer, said second conductor lead layers being patterned by use of the same said second novel lift off stencil, where a sum of the thicknesses of the blanket third dielectric spacer layer plus the patterned second dielectric layer separating a patterned first conductor lead layer within the pair of patterned first conductor lead layers from a patterned second conductor lead layer within the pair of patterned second conductor lead layers is greater than a single thickness of the blanket third dielectric spacer layer separating the patterned first magnetoresistive (MR) layer within the first trackwidth of the patterned first magnetoresistive (MR) layer from the patterned second magnetoresistive (MR) layer within the second trackwidth of the patterned second magnetoresistive (MR) layer;

a blanket fifth dielectric spacer layer spacer layer formed upon the pair of patterned fourth dielectric layers and upon the patterned second magnetoresistive (MR) layer at the trackwidth of the patterned second magnetoresistive (MR) layer; and a second shield layer formed upon the blanket fifth dielectric spacer layer, where a sum of the thicknesses of the blanket fifth dielectric spacer layer plus the fourth patterned dielectric layer separating a second patterned conductor lead layer within a pair of second patterned conductor lead layers from the second shield layer is greater than a single thickness of the blanket fifth dielectric spacer layer separating the patterned second magnetoresistive (MR) layer from the second shield layer within the trackwidth of the patterned second magnetoresistive (MR) layer.

7. The dual stripe magnetoresistive (DSMR) sensor element of claim 6 wherein the sum of the thicknesses of the blanket third dielectric spacer layer plus the second patterned dielectric layer attenuates electrical leakage between the patterned first conductor lead layer and the patterned second conductor lead layer.

8. The dual stripe magnetoresistive (DSMR) sensor element of claim 6 wherein the second patterned dielectric spacer layer thickness is from about 300 to about 1500 angstroms and the third blanket dielectric layer thickness is from about 100 angstroms to about 1000 angstroms.

9. A magnetic data storage enclosure having fabricated therein a dual stripe magnetoresistive (DSMR) sensor element in accord with claim 6.

10. A method for forming a magnetoresistive (MR) sensor element comprising:

providing a substrate;

forming over the substrate a first shield layer;

forming upon the first shield layer a first dielectric spacer layer;

forming upon the first dielectric spacer layer a (patterned) magnetoresistive (MR) layer;

forming upon the magnetoresistive (MR) layer a blanket first release layer;

forming upon the blanket first release layer a blanket first photoresist layer;

photoexposing and developing the blanket first photoresist layer to provide a remaining portion of the blanket first photoresist layer having a width approximating the desired trackwidth of the magnetoresistive (MR) sensor element;

etching the blanket first release layer, using the remaining first photoresist layer as an etch mask, to provide a symmetric overhang of the remaining first photoresist layer over the blanket first release layer and providing, thereby, a lift off stencil;

employing the lift off stencil as an etch mask to pattern and etch the magnetoresistive (MR) layer;

employing the lift off stencil as a deposition mask to form a pair of longitudinal magnetic biasing layers adjacent to and covering a pair of opposite ends of the patterned second magnetoresistive (MR) layer;

employing the lift off stencil as a deposition mask to form over said pair of longitudinal magnetic biasing layers adjacent to and communicating electrically with a pair of opposite ends of the patterned magnetoresistive (MR) layer a pair of patterned conductor lead layers to define a trackwidth of the patterned magnetoresistive (MR) layer;

employing the lift off stencil as a deposition mask to form over said pair of patterned conducting lead layers a pair of patterned second dielectric layers over the said patterned conductor lead layers, and extending over opposite ends of the patterned magnetoresistive (MR) layer but not completely covering said magnetoresistive (MR) layer;

stripping the lift off stencil, together with any deposition residue remaining upon it, from the patterned magnetoresistive (MR) layer;

forming upon the pair of patterned second dielectric layers and upon the patterned magnetoresistive (MR) layer at the trackwidth of the patterned magnetoresistive (MR) layer a blanket third dielectric spacer layer spacer layer; and forming upon the blanket third dielectric spacer layer a second shield layer, where a first thickness of the blanket third dielectric spacer layer separating a patterned conductor lead layer within a pair of patterned conductor lead layers from the second shield layer is greater than a second thickness of the blanket third dielectric spacer layer separating the patterned magnetoresistive (MR) layer from the third shield layer within the trackwidth of the patterned magnetoresistive (MR) layer.

11. The method of claim 10 wherein the sum of the thicknesses of the blanket third dielectric spacer layer plus the second patterned dielectric layers, attenuates electrical leakage between the patterned first conductor lead layer and the second shield layer.

12. The method of claim 10 wherein the magnetoresistive (MR) sensor element is selected from the group consisting of single stripe magnetoresistive (SSMR) sensor elements, dual stripe magnetoresistive (DSMR) sensor elements, soft adjacent layer (SAL) magnetoresistive (MR) sensor elements, longitudinally magnetically biased magnetoresistive (MR) sensor elements, transversely magnetically biased magnetoresistive (MR) sensor elements and both transversely and longitudinally magnetically biased magnetoresistive (MR) sensor elements.

13. The method of claim 10 wherein the second patterned dielectric spacer layer thickness is from about 300 to about 1500 angstroms and the third blanket dielectric layer thickness is from about 100 angstroms to about 1000 angstroms.

14. A method for forming a dual stripe magnetoresistive (DSMR) sensor element comprising:

providing a substrate;

forming over the substrate a first shield layer;

forming upon the first shield layer a first dielectric spacer layer;

forming upon the first dielectric spacer layer a first magnetoresistive (MR) layer;

forming upon the first magnetoresistive (MR) layer a blanket first release layer;

forming upon the blanket first release layer a blanket first photoresist layer;

photoexposing and developing the blanket first photoresist layer to provide a remaining portion of the blanket first photoresist layer having a width approximating the desired first trackwidth of the first magnetoresistive (MR) sensor element;

etching the blanket first release layer, using the remaining first photoresist layer as an etch mask, to provide a symmetric overhang of the remaining first photoresist layer over the blanket first release layer and providing, thereby, a first lift off stencil;

employing the first lift off stencil as an etch mask to pattern and etch the first magnetoresistive (MR) layer;

employing the first lift off stencil as a deposition mask to form adjacent to and communicating electrically with a pair of opposite ends of the patterned first magnetoresistive (MR) layer a pair of patterned first conductor lead layers to define a first trackwidth of the patterned first magnetoresistive (MR) layer;

employing the first lift off stencil as a deposition mask to form over said pair of patterned first conducting lead layers a pair of patterned second dielectric layers over the said patterned conductor lead layers, and extending over opposite ends of the patterned first magnetoresistive (MR) layer but not completely covering said patterned first magnetoresistive (MR) layer;

removing the first lift off stencil together with any deposition remnants upon it from the first patterned magnetoresistive layer;

forming upon the pair of patterned second dielectric layers and upon the patterned first magnetoresistive (MR) layer at the first trackwidth of the patterned first magnetoresistive (MR) layer a blanket third dielectric spacer layer;

forming upon the blanket third dielectric spacer layer a (patterned) second magnetoresistive layer;

forming upon the second magnetoresistive (MR) layer a blanket second release layer;

forming upon the blanket third release layer a blanket second photoresist layer;

photoexposing and developing the blanket second photoresist layer to provide a remaining portion of the blanket second photoresist layer having a width approximating the desired first trackwidth of the second magnetoresistive (MR) sensor element;

etching the blanket second release layer, using the remaining second photoresist layer as an etch mask, to provide a symmetric overhang of the remaining second photoresist layer over the second release layer and providing, thereby, a second lift off stencil;

employing the second lift off stencil as an etch mask to pattern and etch the second magnetoresistive (MR) layer;

employing the second lift off stencil as a deposition mask to form a pair of second longitudinal magnetic biasing layers adjacent to and covering a pair of opposite ends of the patterned second magnetoresistive (MR) layer;

employing the second lift off stencil to form adjacent to and communicating electrically with a pair of opposite ends of the patterned second magnetoresistive layer a pair of second conductor lead layers to define a second trackwidth of the patterned second magnetoresistive (MR) layer, where a sum of the thicknesses of the blanket third dielectric spacer layer plus the patterned second dielectric spacer layers separating a patterned first conductor lead layer within the pair of patterned first conductor lead layers is greater than a single thickness of the blanket third dielectric spacer layer separating the patterned first magnetoresistive (MR) layer within the first trackwidth of the patterned first magnetoresistive (MR) layer from the patterned second magnetoresistive (MR) layer within the second trackwidth of the patterned second magnetoresistive (MR) layer;

employing the lift off stencil as a deposition mask to form over said pair of patterned second conducting lead layers a pair of patterned fourth dielectric layers over the said patterned second conductor lead layers, and extending over opposite ends of the patterned second magnetoresistive (MR) layer but not completely covering said second magnetoresistive (MR) layer;

stripping away the second lift off stencil together with any deposition remnant upon it;

forming upon the pair of patterned fourth dielectric layers and upon the patterned second magnetoresistive (MR) layer at the trackwidth of the patterned second magnetoresistive (MR) layer a blanket fifth dielectric spacer layer spacer layer; and forming upon the blanket fifth dielectric spacer layer a second shield layer, where a sum of the thicknesses of the blanket fifth dielectric spacer layer plus the fourth patterned dielectric layer separating a second patterned conductor lead layer within a pair of second patterned conductor lead layers from the second shield layer is greater than a single thickness of the blanket fifth dielectric spacer layer separating the patterned second magnetoresistive (MR) layer from the second shield layer within the trackwidth of the patterned second magnetoresistive (MR) layer.

15. The method of claim 14 wherein the total thickness of the blanket second dielectric spacer layer plus the third blanket dielectric layer attenuates electrical leakage between the patterned first conductor layer and the patterned second conductor layer.

16. The method of claim 14 wherein the second patterned dielectric spacer layer thickness is from about 300 to about 1500 angstroms and the third blanket dielectric layer thickness is from about 100 angstroms to about 1000 angstroms.

* * * * *